United States Patent
Yen et al.

(10) Patent No.: US 8,487,321 B2
(45) Date of Patent: Jul. 16, 2013

(54) AC LIGHT EMITTING ASSEMBLY AND AC LIGHT EMITTING DEVICE

(75) Inventors: Hsi-Hsuan Yen, Hsinchu Hsieh (TW);
Jim-Yong Chi, Hsinchu Hsieh (TW);
Wen-Yung Yeh, Hsinchu Hsieh (TW);
Ting-Chi Lee, Hsinchu Hsieh (TW);
Ming-Te Lin, Hsinchu Hsieh (TW);
Sheng-Pan Huang, Hsinchu Hsieh (TW)

(73) Assignee: Epistar Corporation, Hsinchu (TW)

( * ) Notice: Subject to any disclaimer, the term of this patent is extended or adjusted under 35 U.S.C. 154(b) by 879 days.

(21) Appl. No.: 11/609,538

(22) Filed: Dec. 12, 2006

(65) Prior Publication Data
US 2007/0131942 A1 Jun. 14, 2007

(30) Foreign Application Priority Data
Dec. 13, 2005 (TW) .............................. 94143989 A

(51) Int. Cl.
*H01L 33/00* (2010.01)

(52) U.S. Cl.
USPC ............... 257/88; 257/E33.012; 257/E33.051

(58) Field of Classification Search
USPC ............... 257/88, E33.012, E33.051; 345/82; 340/815.45; 362/240, 249.02, 800
See application file for complete search history.

(56) References Cited

U.S. PATENT DOCUMENTS

| | | | | |
|---|---|---|---|---|
| 3,434,678 A | * | 3/1969 | Heenan et al. | 244/158.1 |
| 3,550,260 A | * | 12/1970 | Saltich et al. | 438/501 |
| 3,582,807 A | * | 6/1971 | Addis | 330/145 |
| 3,668,481 A | * | 6/1972 | Saltich et al. | 257/481 |
| 4,211,955 A | * | 7/1980 | Ray | 315/53 |
| 4,278,985 A | * | 7/1981 | Stobbs | 257/477 |
| 4,281,448 A | * | 8/1981 | Barry et al. | 438/418 |
| 4,460,863 A | * | 7/1984 | Conforti | 320/160 |
| 4,965,457 A | * | 10/1990 | Wrobel et al. | 362/249.06 |
| 6,830,358 B2 | * | 12/2004 | Allen | 362/640 |
| 6,897,771 B1 | * | 5/2005 | Lodhie et al. | 340/479 |
| 6,989,807 B2 | * | 1/2006 | Chiang | 345/82 |

(Continued)

FOREIGN PATENT DOCUMENTS

| CN | 2006101656070 | 12/2008 |
|---|---|---|
| EP | 1 469 529 A2 * | 10/2004 |

(Continued)

OTHER PUBLICATIONS

English-language Abstract for JP 62-32664.*

(Continued)

*Primary Examiner* — Mary Wilczewski
(74) *Attorney, Agent, or Firm* — Muncy, Geissler, Olds & Lowe, PLLC

(57) ABSTRACT

An alternating current (AC) light emitting assembly and an AC light emitting device are disclosed. The AC light emitting assembly includes a substrate; a rectifier unit comprising a plurality of rectifier components arranged in a Wheatstone Bridge, for rectifying an AC signal into a direct current (DC) signal, each of the rectifier components having a high breakdown voltage and a low forward voltage; a light emitting unit electrically connected to the rectifier unit and comprising a plurality of light emitting components formed on the substrate, for emitting light when receiving the DC signal outputted by the rectifier unit; and two conductive electrodes electrically connected to the rectifier unit for receiving and transmitting the AC signal to the rectifier unit. The AC light emitting device includes two stacked and electrically connected AC light emitting assemblies.

20 Claims, 7 Drawing Sheets

U.S. PATENT DOCUMENTS

| | | | | |
|---|---|---|---|---|
| 7,025,473 | B2* | 4/2006 | Dokoupil | 362/640 |
| 7,276,858 | B2* | 10/2007 | Allen | 315/205 |
| 7,344,275 | B2* | 3/2008 | Allen et al. | 362/249.01 |
| 7,345,433 | B2* | 3/2008 | Bacon et al. | 315/291 |
| 7,396,142 | B2* | 7/2008 | Laizure et al. | 362/240 |
| 7,474,681 | B2* | 1/2009 | Lin et al. | 372/43.01 |
| 7,482,761 | B2* | 1/2009 | Yang | 315/185 R |
| 7,524,085 | B2* | 4/2009 | Bedson et al. | 362/249.05 |
| 7,544,524 | B2* | 6/2009 | Lin et al. | 438/22 |
| 7,625,099 | B2* | 12/2009 | Newton et al. | 362/238 |
| 7,659,544 | B2* | 2/2010 | Lu et al. | 257/88 |
| 7,661,852 | B2* | 2/2010 | Yu | 362/362 |
| 7,772,601 | B2* | 8/2010 | Lee et al. | 257/88 |
| 8,294,174 | B2 | 10/2012 | Chen et al. | 257/99 |
| 8,338,837 | B2 | 12/2012 | Yeh et al. | 257/88 |
| 2004/0206970 | A1* | 10/2004 | Martin | 257/98 |
| 2007/0008721 | A1* | 1/2007 | Peng et al. | 362/227 |
| 2007/0131942 | A1* | 6/2007 | Yen et al. | 257/79 |
| 2007/0273299 | A1* | 11/2007 | Miskin et al. | 315/250 |
| 2008/0106212 | A1* | 5/2008 | Yen et al. | 315/192 |
| 2008/0169766 | A1* | 7/2008 | Lin et al. | 315/200 R |
| 2008/0191632 | A1* | 8/2008 | Lee | 315/185 R |
| 2008/0211421 | A1* | 9/2008 | Lee et al. | 315/250 |
| 2008/0218098 | A1* | 9/2008 | Lee et al. | 315/250 |
| 2008/0237613 | A1* | 10/2008 | Lee et al. | 257/88 |
| 2009/0096386 | A1* | 4/2009 | Yeh et al. | 315/294 |
| 2010/0308347 | A1* | 12/2010 | Yeh et al. | 257/88 |
| 2011/0062891 | A1* | 3/2011 | Chen et al. | 315/294 |

FOREIGN PATENT DOCUMENTS

| | | | |
|---|---|---|---|
| JP | 56-81959 | * | 7/1981 |
| JP | 62032664 A | | 12/1987 |
| JP | 7-30149 | * | 1/1995 |
| JP | 11-97747 | * | 4/1999 |
| JP | 2003-305184 | * | 10/2003 |
| WO | WO 2006/095949 | * | 9/2006 |
| WO | WO 2007/0838854 A1 | * | 7/2007 |

OTHER PUBLICATIONS

English translation of the abstract of JP62032664 cited in Chinese Office Action 2006101656070.

* cited by examiner

AC LIGHT EMITTING ASSEMBLY AND AC LIGHT EMITTING DEVICE

BACKGROUND OF THE INVENTION

1. Field of the Invention

This invention relates to alternating current (AC) light emitting assemblies and AC light emitting devices, and more particularly, to an AC light emitting assembly and an AC light emitting device having the AC light emitting assembly, the AC light emitting assembly having a rectifier component for rectifying an AC signal into a direct current (DC) signal, the rectifier component having a high breakdown voltage and a low forward voltage.

2. Description of Related Art

With the rapid development of opto-electronics technology, light emitting diode (LED) has becoming one of the most popular light emitting components in the market and has been applied to varieties of electronic fields. In particular, alternating current (AC) LED has been proclaimed by Seoul Semiconductor Co. and III-N Technology Co. in a product announcement symposium to be a global product in the near future.

When receiving an AV signal, an AC LED emits light only during the positive half cycle of the AC signal. A Wheatstone Bridge is introduced to solve such the problem. In result, more than one half of a plurality of AC LEDs arranged in the Wheatstone Bridge emit light every half cycle of the AC signal.

Further, the adoption of an AC LED as a rectifier component in the Wheatstone Bridge introduces two drawbacks. One is that the Wheatstone Bridge has to comprises many rectifier components because the rectifier components have a low breakdown voltage. Practically, each of the four arms of the Wheatstone Bridge has to be provided with two or more than two rectifier components. If receiving an 110 volt AC signal, the Wheatstone Bridge requires as many as 40 rectifier components, 20 of which are installed in a positive path where a positive half cycle of the 110 volt AC signal passes, and the other 20 of the which are installed in a negative path where a negative half cycle of the 110 volt AC signal passes, such that the Wheatstone Bridge is robust enough to survive from a breakdown voltage induced from the 110 volt AC signal and having a peak value as high as 156 volts ($110 \times \sqrt{2}$). According to such a design, the Wheatstone bridge has only 110V/3.1V (an actuation voltage to actuate the AC LED)−20 (a number of AC LED for rectification)=15 AC LEDs capable of emitting light. In conclusion, the AC LEDs for rectification are far more than the AC LEDs for light emission, and the majority of input power will be consumed by the rectifier components and the Wheatstone Bridge has a low overall efficiency. The other one of the drawbacks is that the Wheatstone Bridge, though having a larger light emitting area compared to the prior art, still have many rectifier components do not emit any light during a reverse biased voltage, and has a significant portion of the light emitting area wasted.

Therefore, how to provide a design, even comprising few rectifier components, able to survive the reverse biased voltage applied by the AC signal has becoming one of the most urgent errands in the art.

SUMMARY OF THE INVENTION

In views of the above-mentioned problems of the prior art, it is a primary objective of the present invention to provide an AC light emitting assembly and an AC light emitting device comprising the AC light emitting assembly, which comprises few rectifier components but is still robust enough to survive from the reverse biased voltage applied by the AC signal.

It is another objective of the present invention to provide an AC light emitting assembly and an AC light emitting device comprising the AC light emitting assembly, to reduce the power consumed by the rectifier components and increase the overall efficiency.

It is a further objective of the present invention to provide an AC light emitting assembly and an AC light emitting device comprising the AC light emitting assembly, to increase the light emitting area.

To achieve the above-mentioned and other objectives, an AC light emitting assembly includes a substrate; a rectifier unit comprising a plurality of rectifier components arranged in a Wheatstone Bridge, for rectifying an AC signal, each of the rectifier components having a high breakdown voltage and a low forward voltage; a light emitting unit electrically connected to the rectifier unit and comprising a plurality of light emitting components formed on the substrate, for emitting light when receiving the rectified AC signal outputted by the rectifier unit; and two conductive electrodes electrically connected to the rectifier unit for receiving and transmitting the rectified AC signal to the rectifier unit.

Further, the AC light emitting device includes two stacked and electrically connected above-described AC light emitting assemblies.

In contrast to the prior art, the present invention adopts a rectifier component having a high breakdown voltage and low forward voltage to rectify an AC signal into a DC signal, to reduce a number and power consumption of the rectifier components, increase the overall efficiency, and enlarge the overall light emitting area due to the saved space resulting from the reduction of the usage of the rectifier components.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
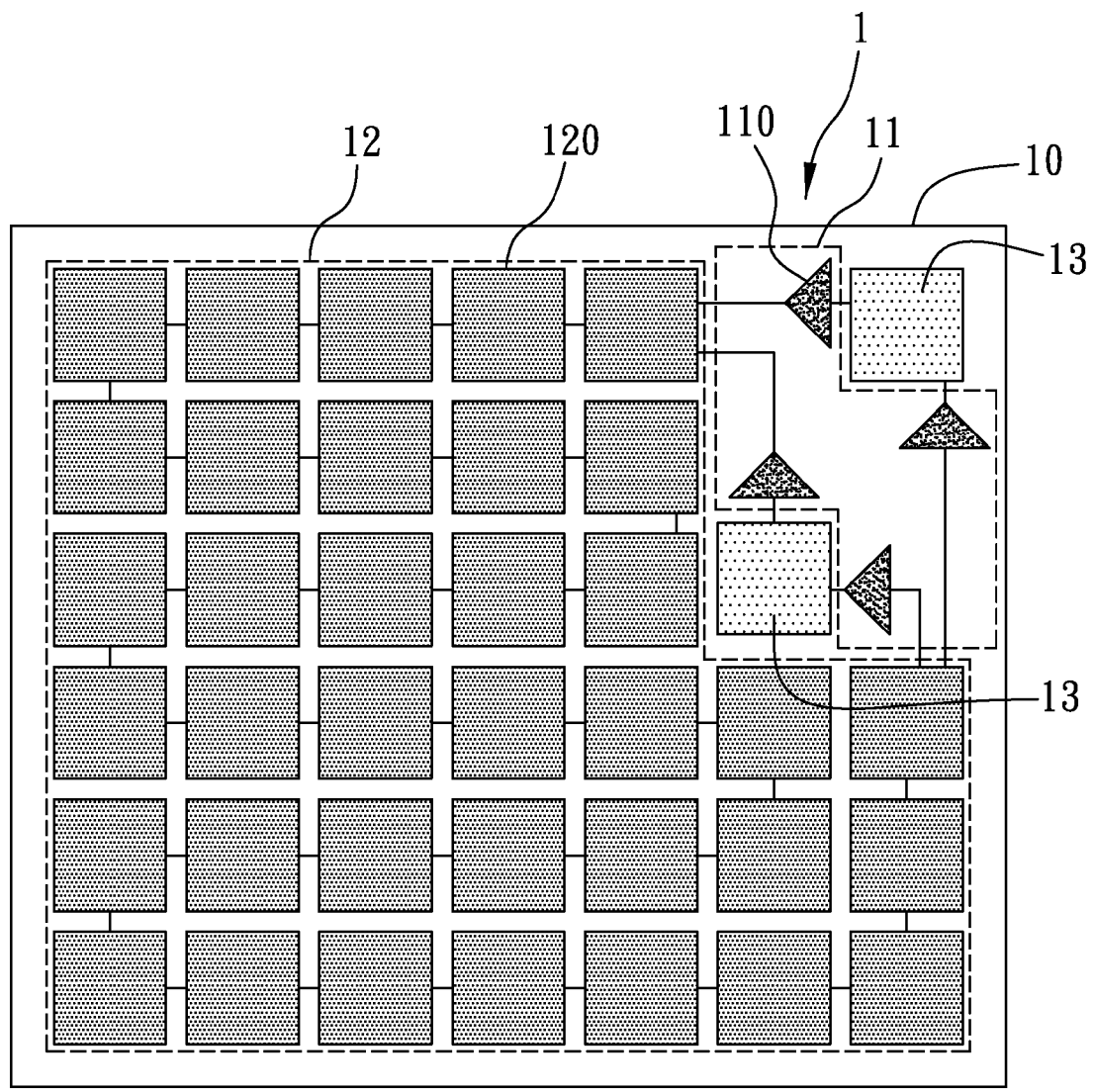
FIG. 1 is a top view of an AC light emitting assembly of the present invention.

The following embodiments are described in sufficient detail to enable those skilled in the art to make and use the invention. It is to be understood that other embodiments would be evident based on the present disclosure, and that proves or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known configurations and process steps are not disclosed in detail.

Likewise, the drawings showing embodiments of the structure are semi-diagrammatic and not to scale and, particularly, some of the dimensions are for the clarity of presentation and are shown greatly exaggerated in the drawings. Similarly, although the views in the drawings for ease of description generally show similar orientations, this depiction in the drawings is arbitrary for the most part. Generally, the invention can be operated in any orientation.

For expository purposes, the term "horizontal" as used herein is defined as a plane parallel to the plane or surface of the substrate, regardless of its orientation. The term "vertical" refers to a direction perpendicular to the horizontal as just defined. Terms, such as "on", "above", "below", "bottom", "top", "side" (as in "sidewall"), "higher", "lower", "upper", "over", and "under", are defined with respect to the horizontal plane.

Figure 2:
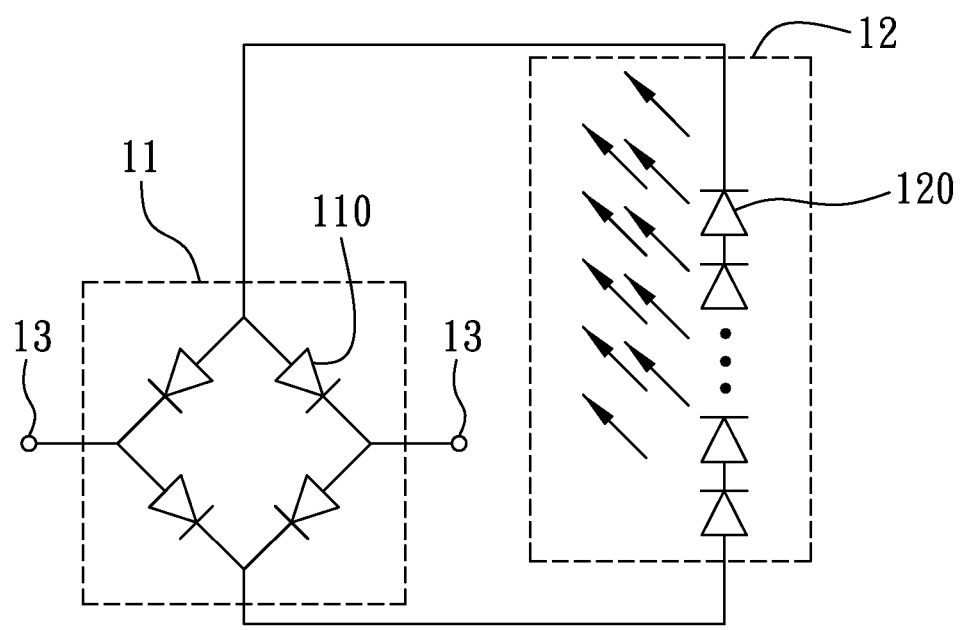
FIG. 2 is an equivalent circuit diagram of the AC light emitting assembly shown in FIG. 1.

FIG. 1 is a top view of an AC light emitting assembly 1 of the present invention. FIG. 2 is an equivalent circuit diagram of the AC light emitting assembly 1. The AC light emitting assembly 1 comprises a substrate 10, a rectifier unit 11 formed on the substrate 10, a light emitting unit 12 formed on the substrate 10 and electrically connected to the rectifier unit 11, and two conductive electrodes 13 electrically connected to the rectifier unit 11.

The substrate 10 is used for carrying other components of the AC light emitting assembly 1, so as to form a modularized component. Preferably, the substrate 10 is a chip or an insulating substrate.

The rectifier unit 11 comprises a plurality of rectifier components 110 arranged in a Wheatstone Bridge, for rectifying an AC signal into a DC signal. Each of the rectifier components 110 has a high breakdown voltage and a low forward voltage. Preferably, the rectifier components 110 comprise a vertical-structured or/and a planar-structured Schottky Barrier Diode (SBD).

As shown in FIGS. 1 and 2, the rectifier unit 11 comprises only four rectifier components 110. Therefore, each of the four rectifier components 110 has to endure as high as 78 volts, if a 110 volt AC signal is applied to the rectifier unit 11. Because the SDB has a high breakdown voltage, the rectifier unit 11, even comprising only four rectifier components 110, is robust enough to suffer from the applied 110 volt AC signal. Further, the rectifier unit 11 consumes less power and has a great overall efficiency. Note that the rectifier unit 11 of the AC light emitting assembly 1 of the present invention can comprise any number of rectifier units 11, to satisfy various practical demand.

Figure 3A:
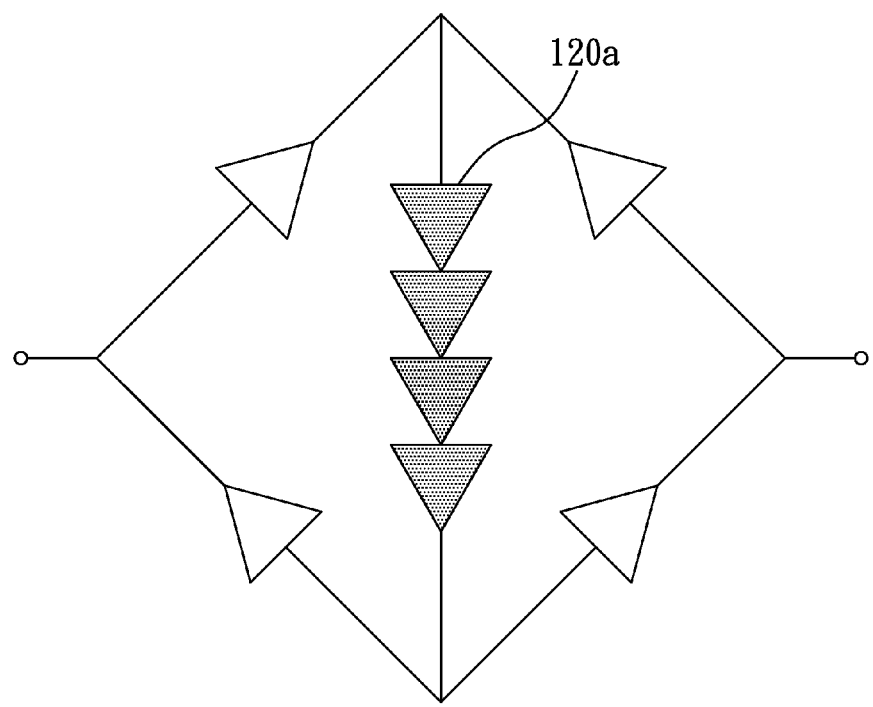
FIGS. 3(A) to 3(D) and 4 are top views of a light emitting unit of an AC light emitting of various embodiment according to the present invention.
Figure 3B:
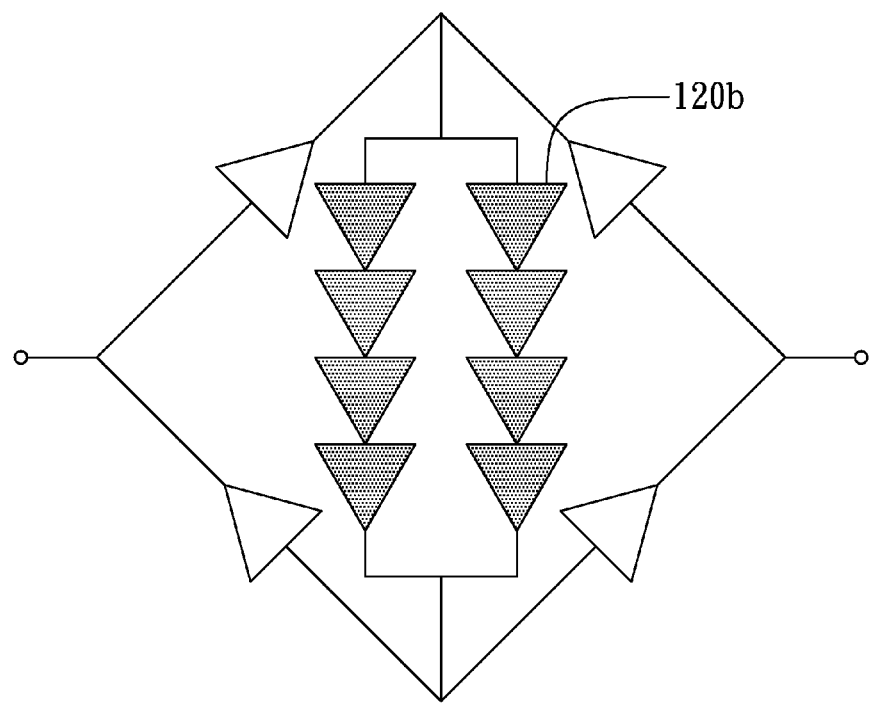
Figure 3C:
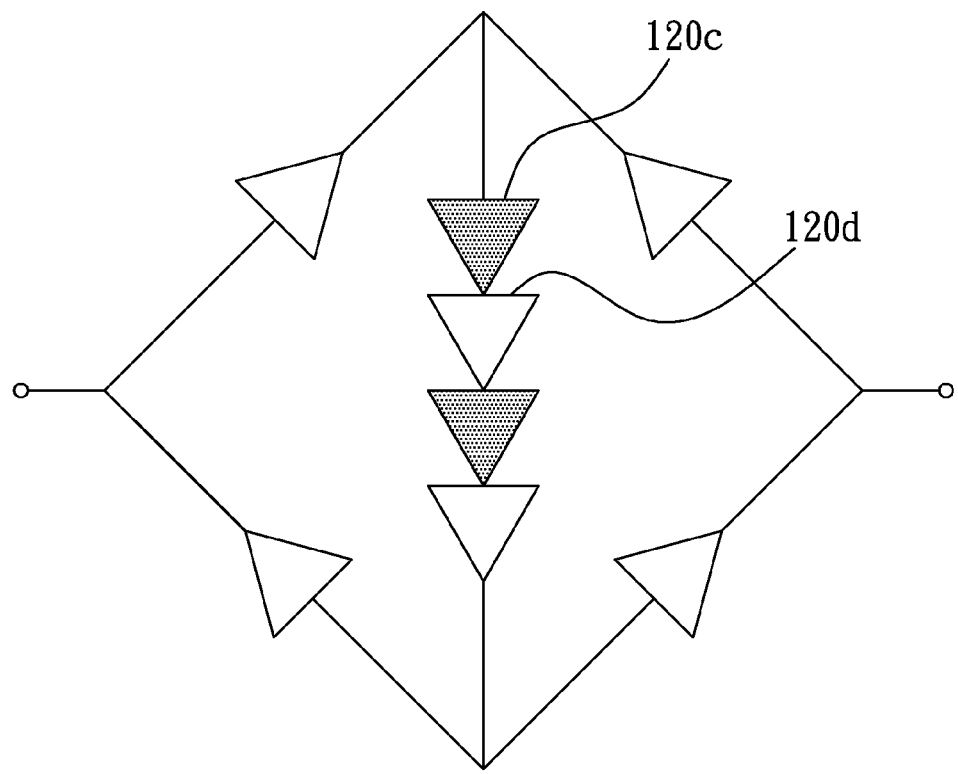
Figure 3D:
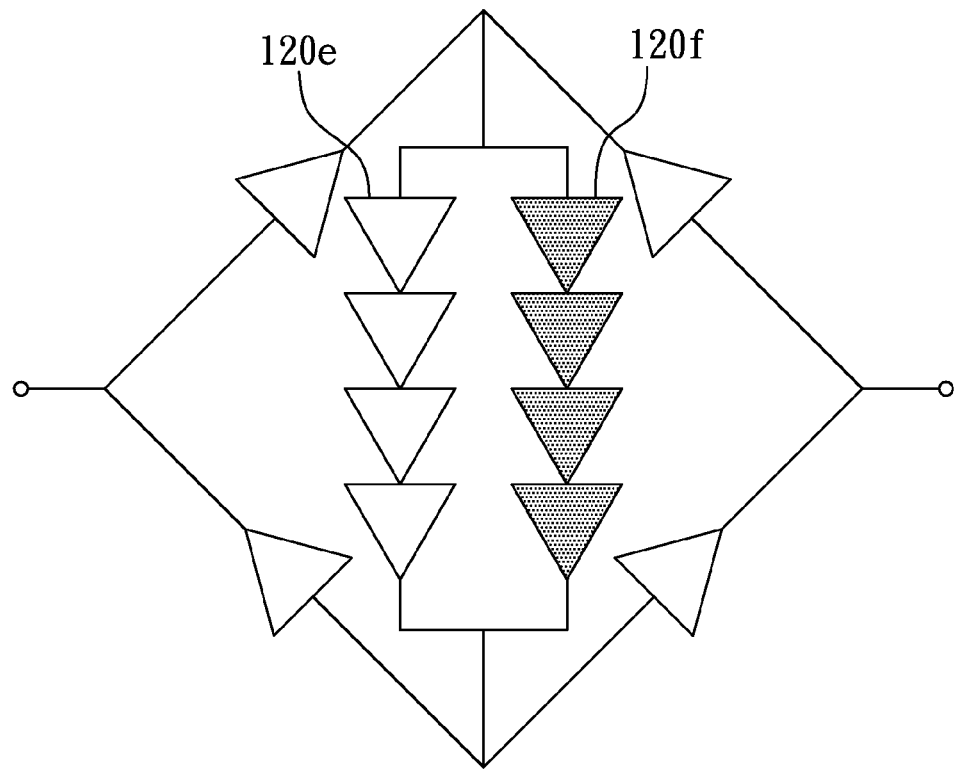

The light emitting unit 12 comprises a plurality of connected light emitting components 120 formed on the substrate 10 for emitting light when receiving the DC signal outputted by the rectifier unit 11. The light emitting components 120 are connected either in series with or in parallel to the rectifier components 110. How many light emitting components 120 are included in the light emitting unit 12, how long is a wavelength of the light emitted by the light emitting components 120, and how the light emitting components 120 are connected to one another can be determined according to practical light-mixing needs. As shown in FIG. 3(A), four light emitting components 120a, which emit light having the same wavelength, are serially connected. As shown in FIG. 3(B), four left serially-connected light emitting components 120b and four right serially-connected light emitting components 120b are connected in parallel to each other, and light emitted by the eight light emitting components 120b has the same wavelength. As shown in FIG. 3(C), two light emitting components 120c, which emit first light having a first wavelength, are serially connected to another two light emitting components 120d, which emit second light having a second wavelength different from the first wavelength. As shown in FIG. 3(D), four serially-connected light emitting components 120f, all of which emit the first light, are connected in parallel to another four serially-connected light emitting components 120e, all of which emit the second light.

Each of the light emitting components 120, 120a, 120b, 120c, 120d, 120e and 120f comprises a light emitting active layer formed by integrating a P-type semiconductor structure such as P-InGaN with an N-type semiconductor structure such as N-InGaN (equivalent to an LED). Each of the P- and N-type semiconductor structures has an ohm electrode for electrical connection.

Figure 4:
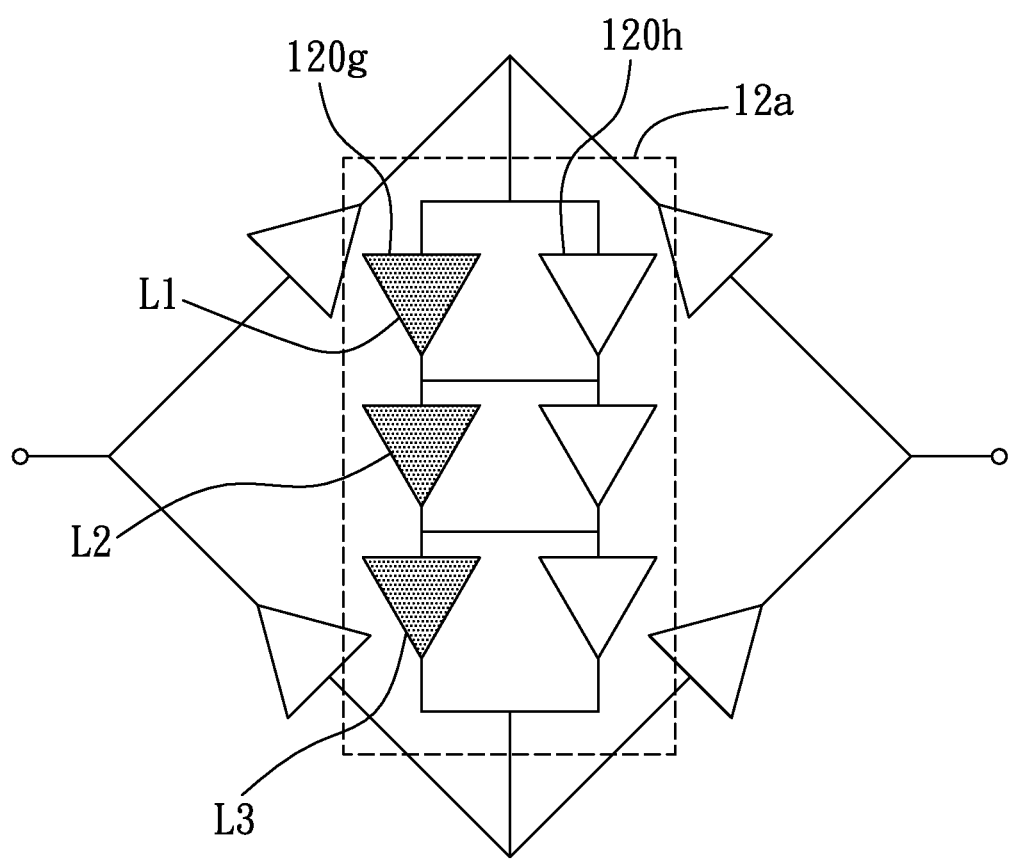

Referring to FIG. 4, another light emitting unit 12 comprises two light emitting components 120g and 120h, each of which has three light emitting active layers L1, L2 and L3, to achieve the goal of light mixture. The light emitting components 120g and 120h are formed by Epitaxy, wafer bonding, or flip chip techniques. One of the light emitting active layers L1, L2 and L3 has a structure the same as that of the light emitting active layer of the light emitting components 120a, 120b, 120c, 120d, 120e and 120f.

The two conductive electrodes 13 are installed for receiving the AC signal and transmits the AC signal to the rectifier unit 11, which rectifies the AC signal into the DC signal. As shown in FIGS. 1 and 2, the disposition of the rectifier unit 11, which comprises only four rectifier components 110, allows the light emitting unit 12 of the AC light emitting assembly 1 to comprises more light emitting components 120, so as to enlarge a light emitting area of the AC light emitting assembly 1.

Figure 5A:
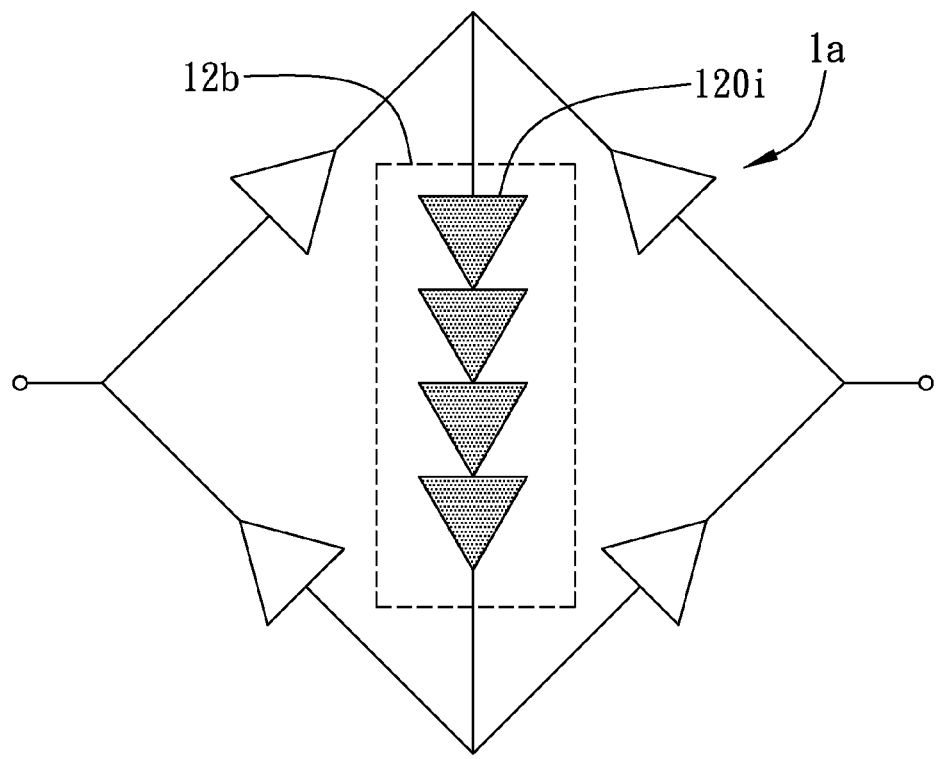
FIGS. 5(A) and 5(B) are top views of an AC light emitting device of the present invention.
Figure 5B:
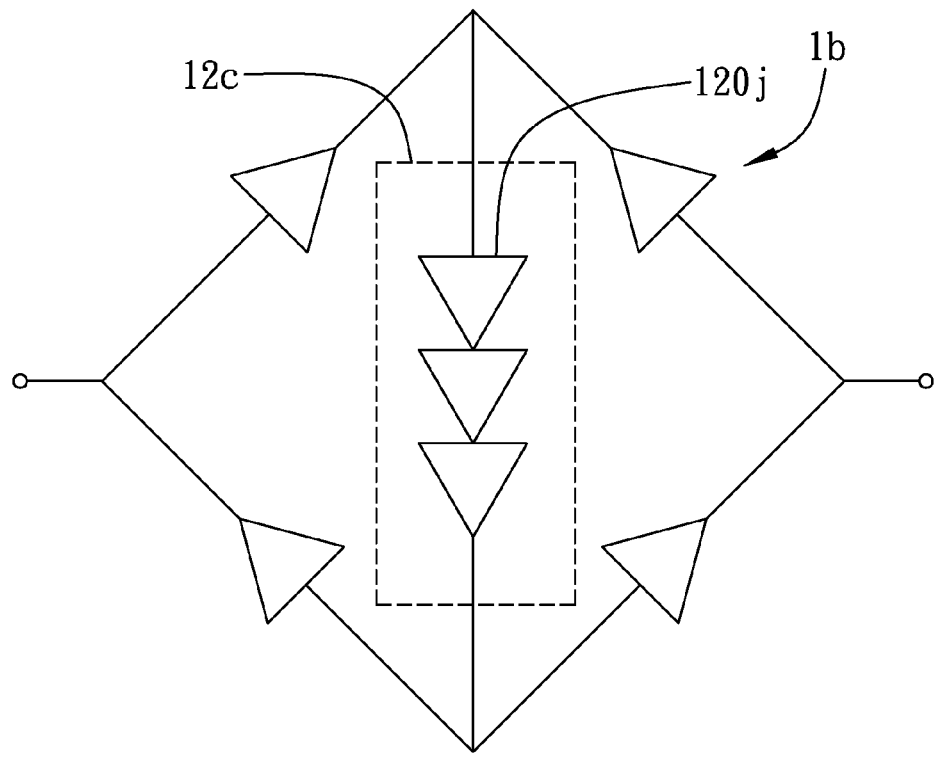
Figure 6A:
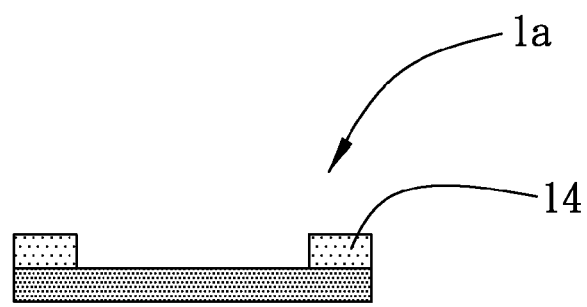
FIGS. 6(A) to 6(C) are side views of the AC light emitting device shown in FIGS. 5(A) and 5(B).
Figure 6B:
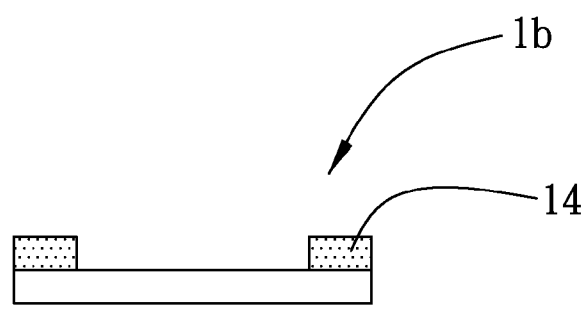
Figure 6C:
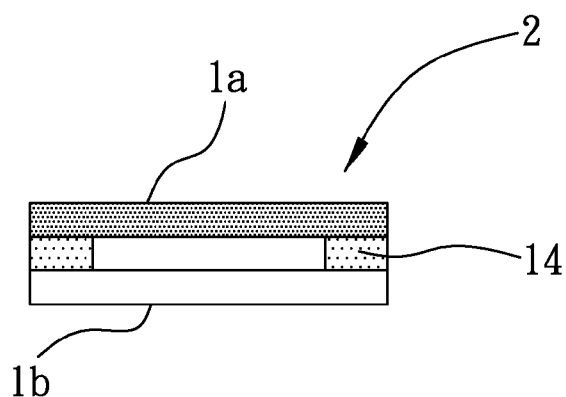

The present invention further discloses an AC light emitting device 2 having at least two the above-described AC light emitting assemblies 1. FIGS. 5(A) and 6(A) are a top view and a side view of an AC light emitting assembly 1a. FIGS. 5(B) and 6(B) are a top view and a side view of an AC light emitting assembly 1b. In order to simplify FIGS. 6(A) and 6(B), the two AC light emitting assemblies 1a and 1b are represented by two connection pads 14. As shown in FIG. 6(C), the AC light emitting device 2 comprises the AC light emitting assemblies 1a and 1b, which are connected by the connection pads 14 and adhered by the flip chip technique, such that the AC light emitting assembly 1a is electrically connected and adhered to the AC light emitting assembly 1b.

In contrast to the prior art, the present invention adopts a rectifier component having a high breakdown voltage and low forward voltage to rectify an AC signal into a DC signal, to reduce a number and power consumption of the rectifier components, increase the overall efficiency, and enlarge the overall light emitting area due to the saved space resulting from the reduction of the usage of the rectifier components.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A light emitting device having two stacked and electrically connected alternating current (AC) light emitting assemblies, each assembly comprising:
   an insulating substrate for a chip;
   a rectifier unit comprising a plurality of rectifier components arranged in a Wheatstone Bridge, for rectifying an AC signal from a power source into a rectified AC signal, each of the rectifier components having a high breakdown voltage and a low forward voltage, wherein at least one of the rectifier components is a Schottky Barrier Diode (SBD);

a light emitting unit comprising a plurality of electrically connected light emitting components formed on the substrate, electrically connected to the rectifier unit, for emitting light when receiving the rectified AC signal directly from the rectifier unit; and two conductive electrodes electrically connected to the rectifier unit for receiving and transmitting the AC signal to the rectifier unit.

2. The light emitting device of claim 1, wherein the SBD is a vertical-structured SBD.

3. The light emitting device of claim 1, wherein the SBD is a planer-structured SBD.

4. The light emitting device of claim 1, wherein the light emitting components are electrically connected to the rectifier components in series and parallel.

5. The light emitting device of claim 1, wherein the light emitting components emit light having the same wavelength.

6. The light emitting device of claim 1, wherein the light emitting components emit light having two different wavelengths.

7. The light emitting device of claim 1, 4, 5 or 6, wherein at least one of the light emitting components has a light emitting active layer.

8. The light emitting device of claim 7, wherein the light emitting active layer comprises a P-type semiconductor structure and an N-type semiconductor structure.

9. The light emitting device of claim 8, wherein each of the P- and N-type semiconductor structures has an ohmic electrode for electrical connection.

10. The light emitting device of claim 9, wherein the P-type semiconductor structure comprises P-InGaN.

11. The light emitting device of claim 9, wherein the N-type semiconductor structure comprises N-InGaN.

12. The light emitting device of claim 1, wherein at least one of the light emitting components has two light emitting active layers.

13. The light emitting device of claim 12, wherein the light emitting active layers are formed by an Epitaxy technique.

14. The light emitting device of claim 12, wherein the light emitting active layers are formed by a wafer bonding technique.

15. The light emitting device of claim 12, wherein the light emitting active layers are formed by a Flip Chip technique.

16. The light emitting device of claim 12, wherein at least one of the light emitting active layers comprises a P-type semiconductor structure and an N-type semiconductor structure.

17. The light emitting device of claim 16, wherein each of the P- and N-type semiconductor structures has an ohmic electrode for electrical connection.

18. The light emitting device of claim 17, wherein the P-type semiconductor structure comprises P-InGaN.

19. The light emitting device of claim 17, wherein the N-type semiconductor structure comprises N-InGaN.

20. The light emitting device of claim 1, wherein the substrate is a common substrate.

* * * * *